United States Patent [19]
Squilla et al.

[11] Patent Number: 5,898,779
[45] Date of Patent: Apr. 27, 1999

[54] PHOTOGRAHIC SYSTEM WITH SELECTED AREA IMAGE AUTHENTICATION

[75] Inventors: John R. Squilla; Omid A. Moghadam, both of Rochester; Majid Rabbani, Pittsford, all of N.Y.

[73] Assignee: Eastman Kodak Company, Rochester, N.Y.

[21] Appl. No.: 08/837,186

[22] Filed: Apr. 14, 1997

[51] Int. Cl.$^6$ .................................................. H04K 1/00
[52] U.S. Cl. .................................................. 380/23; 380/4
[58] Field of Search ............................... 380/23, 7, 4, 5, 380/51

[56] References Cited

U.S. PATENT DOCUMENTS

| 5,499,294 | 3/1996 | Friedman | 380/10 |
| 5,799,082 | 8/1998 | Murphy et al. | 380/7 |
| 5,799,083 | 8/1998 | Brothers et al. | 380/23 |

OTHER PUBLICATIONS

Handbook of Applied Cryptography, Menezes, et al. pp. 321–661, Dec. 1997.
"A Public Key Cryptosystem and a Signature Scheme Based on Discrete Logarithms," Elgamal, IEEE Transactions on Information Theory, V IT31, N4, Jul. 1985.
"A Method for Obtaining Digital Signatures and Public Key Cryptosystems," Rivest, et al. Communications of the ACM V21, N2, Feb. 1978.
"One-Way Hash Functions: Using cryptographic algorithms for hashing" by Bruce Schneier. Dr. Dobbs's Journal, Sep. 1991, pp. 148–151.
"New Directions in Cryptography" by Whitfield Diffie and Martin E. Hellman. IEEE Transactions on Information Theory, vol. IT–22, No. 6, Nov. 1976, pp. 644–654.

*Primary Examiner*—David Cain
*Attorney, Agent, or Firm*—David M. Woods

[57] ABSTRACT

A public key encryption system for authenticating an image includes a digital camera having embedded therein a private key unique to the digital camera. A known public key uniquely based upon the private key is used to decrypt digital data encrypted with the private key to establish authenticity of the image. The encryption system further comprises means for generating one or more patterns each composed of at least one individual area that is visible together with the image of the object, means for designating at least one individual area as an active area of the image suitable for authentication and for generating location data identifying the active area, and means for calculating image hash from image data of the active area of the image using a predetermined hash algorithm. The image hash is then encrypted with the embedded private key, thereby producing a digital signature uniquely associated with the active area of the image, and the image data, the digital signature, and the location data of said active area are stored in a digital record. By confining encryption to this selected region of interest, power requirements for subsequent hashing and encryption are reduced, which is an advantage for portable devices such as a digital camera.

36 Claims, 7 Drawing Sheets

PHOTOGRAHIC SYSTEM WITH SELECTED AREA IMAGE AUTHENTICATION

FIELD OF THE INVENTION

The invention relates generally to the field of electronic photography, and in particular to the authentication of images captured by a digital camera.

BACKGROUND OF THE INVENTION

Capturing images in digital format facilitates their storage, transmission and archiving. These facts, as well as the exponential growth of computing power, have expedited the use of digital cameras in many diverse consumer, commercial, and scientific applications. Ease of capture, archiving, sharing and especially manipulation are features inherent to digital images, as well as attractive features from the standpoint of customers.

However, these same features make the digital image data extremely susceptible to unauthorized altering. In applications where digital images are captured for purposes of establishing a record, such as property and casualty applications in the insurance industry, it is desirable to have a mechanism to authenticate each digital image (so the image can be used as credible evidence at a later date). The need for image authentication, and lack of practical means for authenticating digital images, is a main reason why insurance companies are hesitant to convert to digital photography for their photo record needs. For example, insurance companies would like to capture images of a damaged building as soon as possible to assess the damage and to stop insurance fraud (i.e., some property owners might take the chance to inflict more damage to their property in order to collect larger insurance payments). To combat fraud and limit losses incurred as a result of these activities, insurance agents routinely take film photographs of houses and automobiles as soon as possible after the accident or natural disaster (such as an earthquake). These images are usually stored in a safe archive and are not used unless the claims made by a policy owner far exceeds the estimate made by an assessor.

It is well known to insure the integrity of digital data by using a public key cryptosystem to generate a digital signature for the data. (See, e.g., "New Directions in Cryptography", by Whitfield Diffie and Martin Helena, *IEEE Transactions on Information Theory*, November 1976, pp. 644–654). A public-key cryptosystem uses two keys: a private key and a public (i.e., nonprivate) key. The private key is kept secret and is only provided to the authorized user; the public key is publicly provided or computed from a publicly available formula. Although the public key may be widely known, the integrity of the digital data is maintained because it is not feasible to derive the private key from this information. For the authentication of digital data, the sender maintains possession of the private key, and anyone who has the widely disseminated corresponding public key is able to decrypt the message encrypted by the sender using the private key. Consequently, this procedure provides a way to ensure that messages are not forged: only the private key could have produced a message that is decipherable by anyone having the corresponding public key.

In practice, a "hash" is created by the sender from the message by using a publicly-known mathematical function which maps values from a large domain into a smaller range. For example, a checksum is a simple kind of hash that produces a simple hash file which is much smaller than the original file yet is particularly unique to it. (For example of another algorithm see "*One Way Hash Functions*" by Bruce Schneier, *Dr. Dobb's Journal*, September 1991, pp. 148–151). many more complex and secure transformations are well known to those of skill in this art. The hash file makes it possible to encrypt a smaller representation of the message (the "hash") in order to verify the integrity and source of the larger message. Another advantageous characteristic of a hash is that changing a single bit in the original message input would produce a very different hash output if subjected to the same mathematical hash function.

The sender of a message then generates a unique digital signature by encrypting the hash message using the private key. The result is a second, smaller digital file referred to as a signature that is transmitted along with the plain (unhashed and unencrypted) text message. A recipient may decrypt the digital signature using the public key and then authenticate the message by comparison of the decrypted hash and a hash of the plain text message calculated by the recipient using the same publicly-known hash algorithm. Thus any difference between the hash outputs will readily show that the message has been altered or has been transmitted by a person other than the one possessing the private key. Moreover, as long as the private key remains private, only the private key holder can produce the message decipherable by anyone holding the public key. Without knowledge of the private key, a digital "signature" cannot be forged.

As mentioned earlier, inability to prove the authenticity of a digital photograph taken for the purpose of record keeping in their casualty and property operations is a main reason why the insurance industry is reluctant to use digital photography. One solution to insuring the integrity of digital image data in a digital camera is disclosed in U.S. Pat. No. 5,499,294. The patent discloses the process of using the aforementioned public key cryptosystem to generate a digital signature for the image. The digital signature is generated by hashing the digital image and encrypting the hash using the private key of the public key cryptosystem. Later, when the image is to be authenticated, the public key of the public key cryptosystem is used to decrypt the digital signature, a new hash is made of the image and the decrypted signature is compared with the new hash. If the new hash matches the decrypted signature, the authenticity of the image is verified.

A major drawback of such an authentication system is that a considerable amount of processing is required to generate the digital hash from the image, which has a critical impact on power usage. An important issue in using digital cameras or any portable digital device is the finite amount of on-board battery power. Since the amount of power used in an electronic device is directly proportional to the calculations performed by the device, it is desirable to have algorithms and devices which can achieve their function with a minimum number of calculations. In the case of an authenticating digital camera, it is particularly desirable to capture and authenticate a large number of digital images before a change or recharging of batteries are needed.

SUMMARY OF THE INVENTION

The present invention is directed to overcoming one or more of the problems set forth above in connection with a known digital camera authentication system. A major drawback of such a camera system is that it generates the digital hash from the whole image. By recognizing that in most cases only a small region or regions of interest need to be authenticated, for example, a portion of a car or a house in a picture, the system processing requirements may be greatly reduced by focusing authentication on these regions.

Briefly summarized, according to one aspect of the present invention, a public key encryption system for authenticating an image includes a digital device, such as a digital camera, having embedded therein a private key unique to the digital device and a known public key so uniquely based upon said private key that digital data encrypted with the private key may be decrypted using the public key. The encryption system further comprises means for designating at least one partial area of the image as an active area of the image suitable for authentication and for generating location data identifying the active area, and means for calculating image hash from image data of the active area of the image using a predetermined hash algorithm. The image hash is then encrypted with the embedded private key, thereby producing a digital signature uniquely associated with said active area of the image, and the image data, the digital signature, and the location data of said active area are stored in a digital record.

The advantage of the system is that it allows the photographer to choose a region of interest of the image for authentication. The region of interest in the camera is selected by the user either by choosing a template from a number of pre-stored templates or by selecting areas on a displayed grid on an external LCD screen or an electronic viewfinder. In operation, the user captures the image and views it on an LCD screen on the back of the camera or on an electronic viewfinder. The camera also displays a tile pattern along with the image, and the photographer can select regions of interest by designating the tiles which overlap with the region of interest of the image. By confining encryption to this selected region of interest, power requirements for subsequent hashing and encryption are reduced, which is an advantage for portable devices such as a digital camera.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging systems and devices are well known, the present description will be directed in particular to elements forming part of, or cooperating more directly with, apparatus in accordance with the present invention. Elements not specifically shown or described herein may be selected from those known in the art. Some aspects of the present description may be implemented in software. Unless otherwise specified, all software implementation is conventional and within the ordinary skill in the programming arts.

Figure 1A:
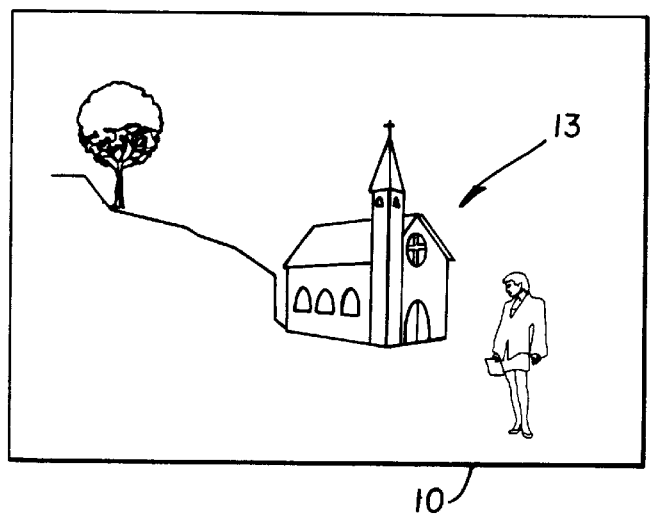
FIGS. 1A, 1B, and 1C are figures of an original scene, a grid pattern for overlaying the scene, and an area of the scene selected for digital authentication based on the grid pattern.
Figure 1B:
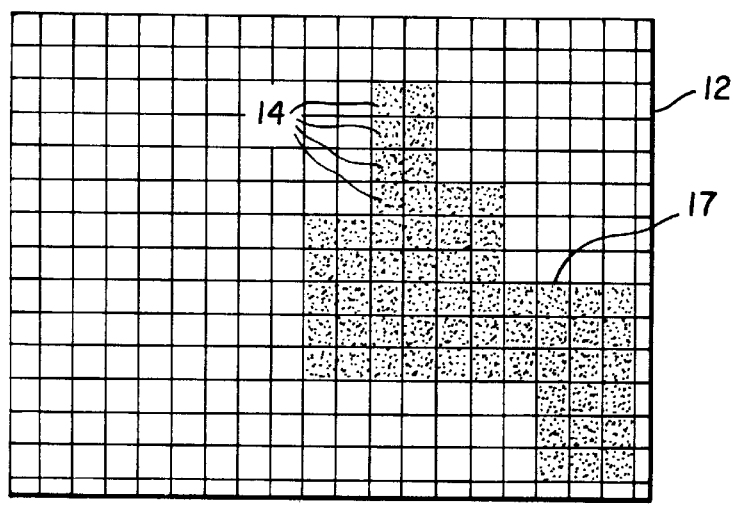
Figure 1C:
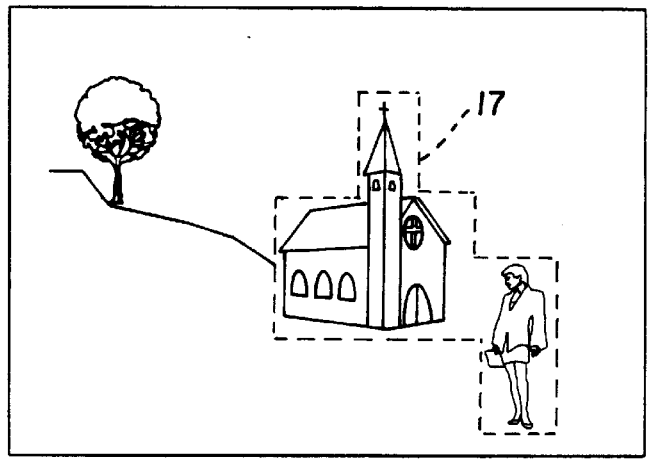

The system of the current invention allows the photographer to choose a region of interest of the image for purposes of authentication. The region of interest in the camera is selected by the user either by choosing a template, which is shown herein in the form of a tile pattern, from a number of pre-stored templates or by selecting one or more individual areas on a predetermined tile pattern grid. In either case, the tile patterns are displayed on an electronic display, such as a liquid crystal display (LCD) screen or an electronic viewfinder. In practice, the user captures a scene image 10, as shown in FIG. 1A, using the digital camera of the present invention. The captured image is then viewed, e.g., on an LCD screen on the back of the camera or on an electronic viewfinder. In one embodiment, the camera displays a grid like tile pattern 12 (as shown in FIG. 1B) along with the image 10, and the photographer can select regions of interest by designating specific tiles 14 which overlap a region 13 of interest of the image (FIG. 1A). For example, as shown in FIG. 1B, individual areas 14 are designated one after another until a specific area 17 is fully overlapped (FIG. 1C). The selection process can be speeded up by storing a number of different templates in the camera memory; the templates, e.g., are preformed to overlap selected areas of the image (see, e.g., the several templates shown in FIG. 3).

Figure 2:
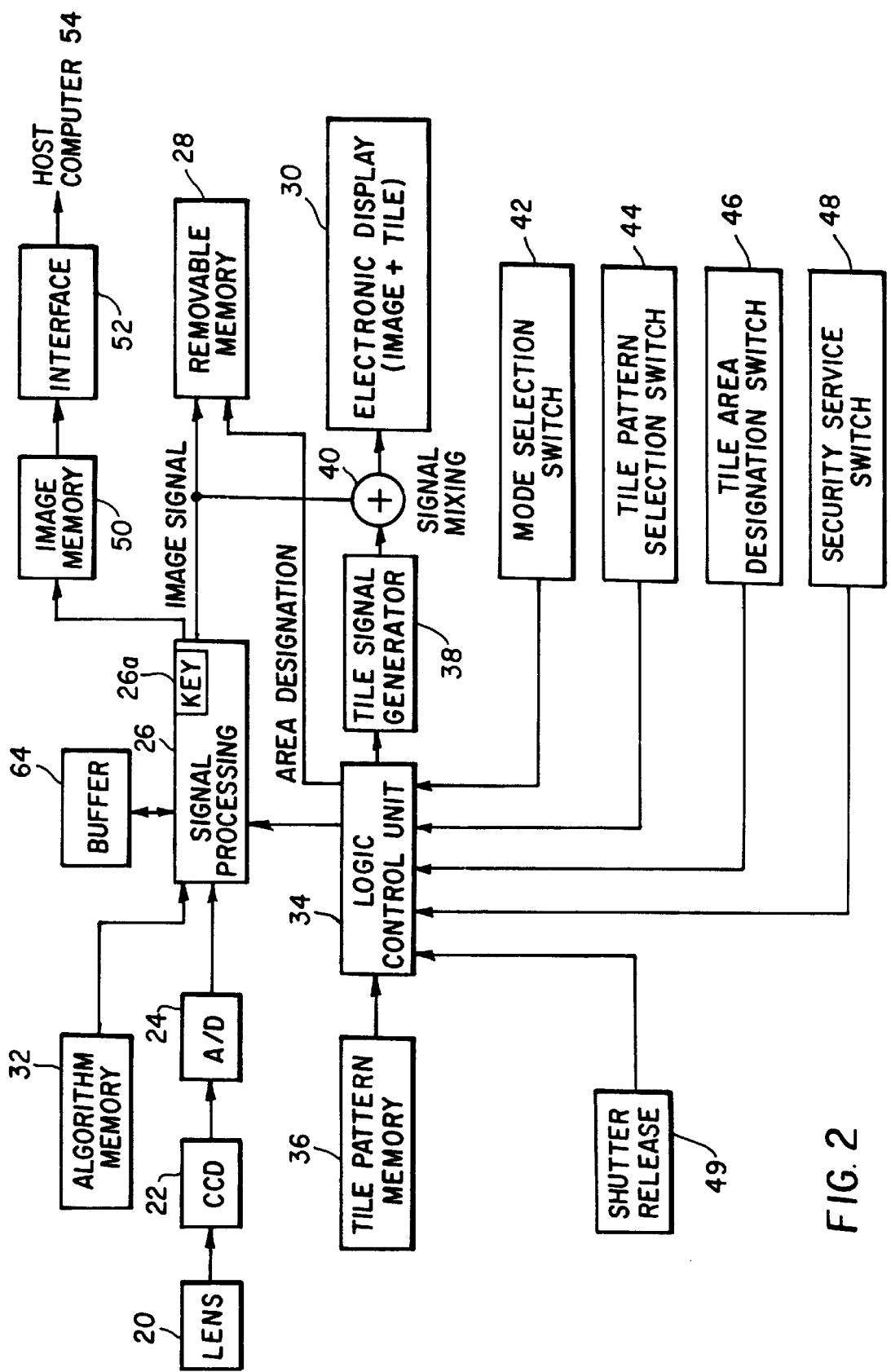
FIG. 2 is a block diagram of a digital camera capable of digital authentication of a selected area of an image according to the invention.
Figure 3:
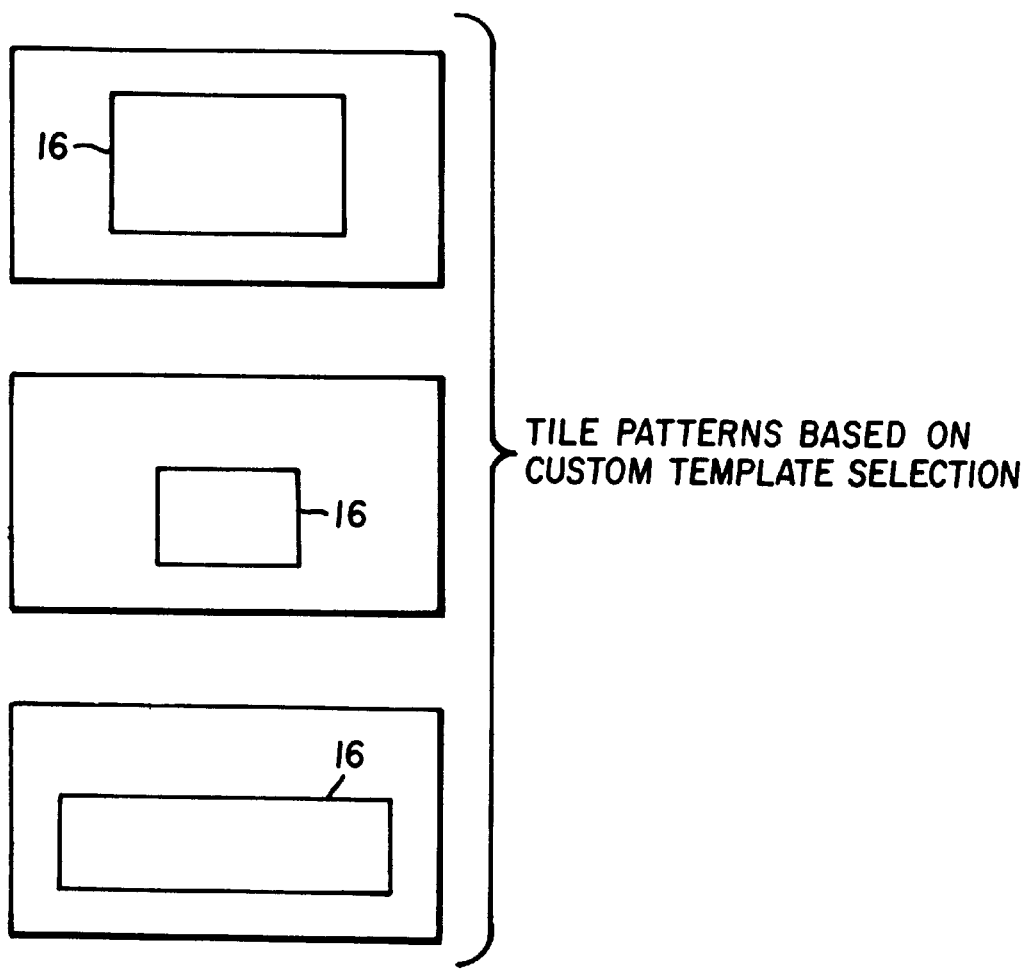
FIG. 3 shows a number of prerecorded tile patterns that are useful with the aforementioned embodiment.

FIG. 2 is a block diagram of a digital camera incorporating a selected area image authentication capability according to the invention. The digital camera includes a lens 20 for directing image light from a scene upon an image receiver such as a charge coupled device (CCD) sensor 22. The image captured by the CCD sensor 22 is converted to digital data by an analog-to-digital (A/D) converter 24, processed in a signal processing section 26, and stored in a removable output memory 28. The camera also includes an electronic display 30, such as a liquid crystal display (LCD) panel, which generates the grid-like tile pattern 12 shown in FIG. 1B that is superimposed as a mostly transparent template over the image of the captured scene 10. To implement the process of encryption, a private key 26a is embedded in a secure microprocessor of the signal processing section 26, and algorithms for hash and encryption are stored in an algorithm memory 32. The camera also includes a logic control unit 34 for driving the electronic display 30, and a tile pattern memory 36 for the tile patterns generated on the display 30. (In one embodiment, the memory 36 stores a single grid overlay as shown in FIG. 1B; in another embodiment the memory 36 stores a plurality of tile patterns such as shown in FIG. 3.) The tile pattern is converted into a video signal by a tile signal generator 38 and combined with the image signal in a signal mixing section 40. The combined video signal (image signal plus tile signal) is then displayed on the electronic display 30.

A multi-functional mode selector switch 42 allows selection among several camera operation modes, including an image area authentication mode. A tile pattern selection switch 44 is used for selecting a particular tile pattern 12 (if several are available from the tile pattern memory 36). As shown in FIG. 3, each tile pattern has a preformed highlighted area 16. If the single grid pattern shown in FIG. 1B is used, a tile area designation switch 46 is used for cycling through the tile areas 14 and highlighting one tile area after the other. The tile pattern 12 is composed of a number of intersecting lines which define the individual tile areas 14, one or more of which may be designated as an active area for purposes of securing the image. In the course of deciding which tile areas should become active areas, one or more tile areas 14 are highlighted for consideration, such as the highlighted tile area 17 in FIG. 1B. A security service switch 48 is used to designate either a particular preformed template area 16 or a particular highlighted tile area 17 as a secure area. The action of enabling the security service switch 48 may cause some further change in the highlighted tile areas, such as the overall graying of the area such that a darkened underlying image is seen through a grey tint. In the course of this procedure, the highlighted area 17 is defined as shown in FIG. 1B, or the preformed area 16 as shown in FIG. 3, and made to overlap an area of interest that needs to be authenticated.

When the security service switch 48 is engaged, the location of the designated active area within the image is noted by the logic control unit 34. The camera 10 also includes a shutter release 49 for initiating image capture and storage of the captured image in the output memory 28. Subsequent to designation of tile areas 16 or 17 as active areas of the image, and triggering of the shutter release 49, pixel locations within these active areas are stored in the memory 28 with the image data. Such locations may be positional coordinates or X-Y addresses of the selected pixels, or the like. The memory 28 is shown in FIG. 2 as a removable memory and accordingly functions as a memory location that is accessible to apparatus, e.g., a computer, external to the digital camera. Alternately, the image may be stored in a resident image memory 50 and accessed through a suitable interface 52 interconnected with a host computer 54.

Figure 4:
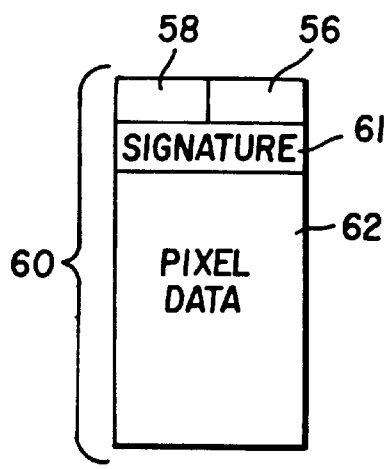
FIG. 4 is an illustration of a file format for data output by the digital camera shown in FIG. 2.

In the output data stream of the digital camera, the location of the selected pixels within the tile areas identified for digital authentication are noted in a table contained as a separate field 56 in a file header 58 of the image format 60, as shown in FIG. 4. Presence of a selected pixel in an active area in a certain tile area in the overall tile grid is noted with, e.g., the digital coordinates of the pixel. The digital signature calculated in the camera from these selected pixels is stored in a signature field 61 and the image data is stored in a data field 62. The location data identifying the location of the pixels selected for authentication may, alternatively to or in addition to storage in the field 56, be encrypted and stored in the digital signature field 61 with the encrypted image hash. An application program in the external apparatus (computer) will identify image pixel data in the pixel data field 62 associated with the secure area, and further associate the location of such image pixel data with special processing, according to the hash algorithm used by the camera.

The system may also ask the user via the display 30 to input any additional information (hereafter referred to as photographer's information) that may be included for subsequent authentication along with the image. Examples of photographer's information include the time of the day, exposure settings, the name of the photographer, information about the scene and its content, or any other type of information required by the application. This information may be input through a keypad (not shown) or like kind of data entry device. Such "photographer's information" may also be stored in the file header 58, or encrypted and stored with the encrypted image hash in the digital signature field 61.

FIG. 3 illustrates examples of three different templates that can be stored in the tile pattern memory 36. Once the mode selection switch 42 is engaged to select the security service feature on the camera, the mode selected is shown on the external display 30. If several different tile patterns are stored in the pattern memory 36, the tile pattern selection switch is enabled to effectuate a choice among these tile patterns. The photographer pages through the stored tile patterns by using the switch 44 and selects the tile pattern to be applied to the image represented in the display 30. The mode switch 42 is also used to enable the tile area designation function shown in connection with FIG. 1B, which begins by highlighting the first tile in the pattern. The photographer then decides whether the highlighted tile area is of sufficient interest to be activated. If it is, the security service button 48 is pressed, the active area is further greyed, and the tile area location is stored in a buffer. If it is not to be activated, the next area is highlighted and the process is repeated. (If the photographer has a change of mind, the security service button 48 would be programmed so that the photographer could return to a designated tile area, push the button and erase the tile area as an active area.) After all tile areas are processed, the locations of the pixels selected for authentication are stored according to the image format 60 in the output memory 28.

Once the region of interest has been selected, the photographer adds the security feature to the image file by pushing the security service switch 48. At this point, the information about the template(s), along with the pixel values enclosed by the selected region(s) are temporarily stored in a buffer 64 for the subsequent hashing and encryption. In most applications, it is advantageous to also store the "photographer's information" in unencrypted (plaintext or cleartext) format. The unencrypted information can be used for quick reference in the future without the need to decrypt and authenticate that information.

Once the pixel values of the selected regions of the image and the desired additional photographer's information have been specified as a string of digital data consisting of ones and zeros, the process of creating the digital signature commences. It should be noted that given the digital nature of the image data, the techniques used for digital signature creation are similar to those used for creating digital signatures for digital data files. The digital signature can be created using one of the several currently available techniques or standards that are used to create digital signatures for digital files. A detailed description of such techniques and standards can be found in chapters 9–15 of the "Handbook of Applied Cryptography" by Alfred J. Menezes, Paul C. Van Oorshot, and Scott A. Vanstone, published in 1997 by the CRC Press. Among the various public key algorithms proposed over the years, the RSA algorithm is described in "*A Method for Obtaining Digital Signatures and Public-Key Cryptosystems*" by R. L. Rivest, A. Shamir, and L. Adelman, *Communications of the ACM* (February, 1978), and the El Gamal public key algorithm is described in "*A Public Key Cryptosystem and a Signature Scheme Based on Discrete Logarithm,*" by T. El Gamal, *IEEE Transactions on Information Theory* (July, 1985).

Figure 5:
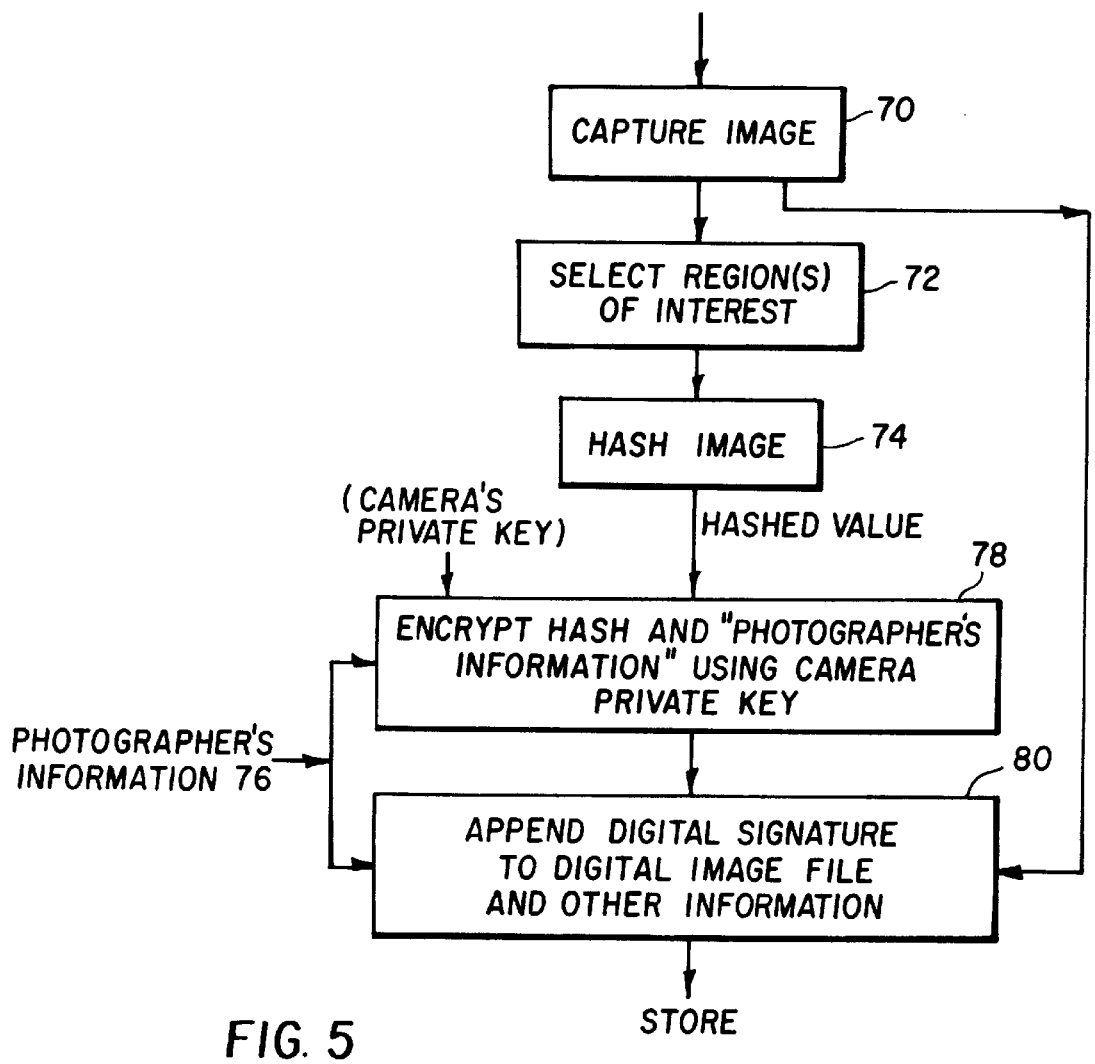
FIG. 5 is a flowchart of a procedure for digitally encrypting a selected area of the image captured by the camera of FIG. 2.

Briefly, as depicted in FIG. 5, after capturing an image (capture step 70) and selecting a region of interest (area selection step 72) the first step in creating a digital signature is to create a hashed value of the digital file from the selected region (hash step 74). The one-way hash functions used at this stage (such as the Secure Hash Algorithm or SHA) produce a fixed size (e.g., 20 bytes) digital file for a digital input file of any size. The hashed value serves as a fingerprint of the image while reducing significantly the size of the data that is subsequently encrypted. The hashing operation serves two purposes. First, it saves processing time due to the fact that the computations involved in creating a hashed value are significantly fewer than the computations required for the ensuing public-key encryption of the data. Second, by reducing the size of the data to be encrypted, the storage requirements of the digital signature are significantly reduced. This is very important in a digital camera where storage space is at a great premium. It should be noted that the process of hashing is a many-to-one mapping and, as such, there are many images that will hash to the same hashed value. However, for all practical purposes, the hashed values are considered unique identifiers of the corresponding digital images.

In the process of hashing a message to produce a digital signature, the original message is retained unaltered; only the message's hash is altered by encryption with a private key. This way the original file can be read by anyone, yet each recipient may authenticate the message by decrypting the message's unique digital signature using the public key. If the decrypted digital signature and hash of the message in question is created by the same mathematical function that matches, both the integrity of the message and the authenticity of the sender are assured.

The next step after hashing the image is to append the "photographer's information" to the hashed data (photographer's information step 76). The digital signature is based on this composite data. Next the digital signature is encrypted (encryption step 78). There are several well known approaches for accomplishing this encryption task that have been explained in detail in the Menezes et al reference noted above. One approach is to use the Digital Signature Algorithms (DSA) that has become a U.S. Federal Information Processing Standard (FIPS 186). Another approach is to use a reversible public-key encryption such as the aforementioned RSA algorithm. As explained before, a public-key system uses two keys, a private key, used by the sender, and a public key, used by the receiver which is publicly available. In this case the "sender" is the digital camera and the private key is only available to the digital camera (e.g., it has been engineered into the camera at the time of manufacturing and cannot be reverse-engineered or accessed in any way). For the purposes of digital signature creation, the private key is used for encryption and the public key is used for decryption. In particular, as depicted in FIG. 5, the private key of the public-key cryptographic system is used by the camera to encrypt the hashed image file plus the "photographer's information" in the encryption step 78. This encrypted file, referred to as the digital signature, is then appended to the digital file (file generation step 80) that contains the image and any other accompanying information such as the "photographer's information".

Figure 6:
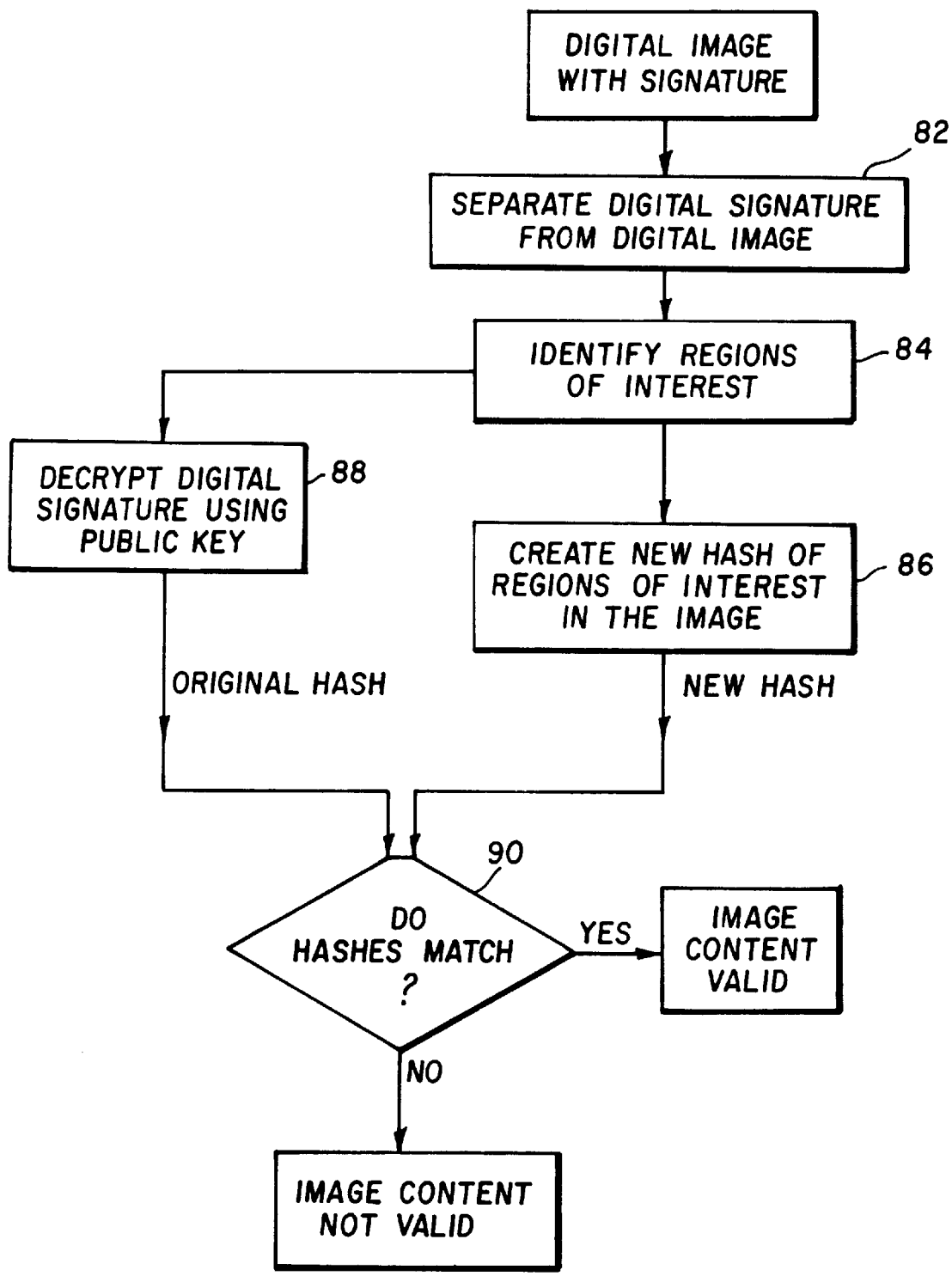
FIG. 6 is a flowchart of a procedure for digitally decrypting and authenticating the selected area of the image that was encrypted as shown in FIG. 5.

The authentication process is depicted in FIG. 6. Since the decryption key (public key) of the camera is publicly available through a directory or a similar means, any user who wants to authenticate the image can use that key to decrypt the appended signature. The first step is to separate the digital signature from the digital image (separation step 82) and the unencrypted header information including the photographer's information. The decrypted signature will include a hashed value of the image information along with the "photographer's information". At this point, if desired, the "photographer's information" can be matched against the unencrypted "photographer's information" that is also included as part of the original image file. The next step in the process is to use the unencrypted header information to determine the regions of the image (identification step 84) that were selected for authentication at the time of picture taking and to select those pixels from the image that needs to be authenticated. The selected pixel values are then hashed in the same manner that was used in the camera (new hash step 86). Meanwhile, the digital signal is decrypted using the public key (decryption step 88) to obtain a decrypted hash value. If the new hashed value is identical to the decrypted hash value (compare step 90), the image is authentic and no tampering has been done to the image since it has been captured by the camera. This is because it is computationally infeasible to generate an encrypted data file that would decrypt into a desired hash value without knowing the private key.

It should be noted that even the slightest change in the original image (i.e., a change of one bit in a single pixel) will cause the hash values to be different. In many digital cameras, to save storage space, the digital image is often compressed by a lossy compression scheme such as the lossy JPEG standard (as described in the ISO/IEC International Standard 109181-1, -2, and -3). If an image is compressed with a lossy compression scheme and then decompressed, the original pixel values can be different from the compressed/decompressed (reconstructed) pixel values. If the hashing and encryption inside the camera is performed on the original image prior to compression, the decompressed image will almost certainly result in a different hashed value and will be flagged as a tampered image.

Figure 7:
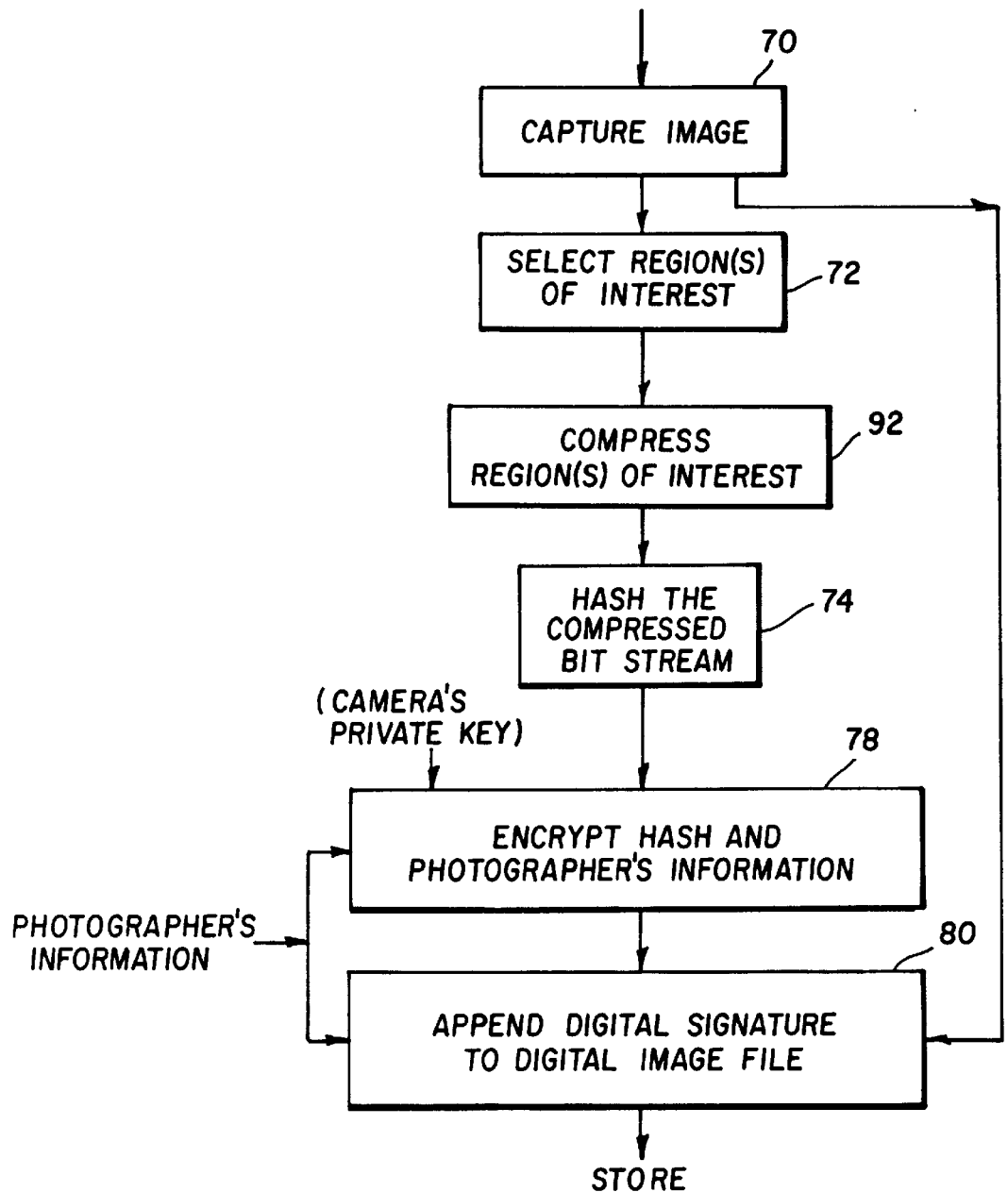
FIG. 7 is a flowchart of a procedure for digitally encrypting a selected area of the image subject to lossy compression.

The encryption procedure is therefore modified when used in digital cameras that employ lossy compression. In particular, as shown in FIG. 7, after the regions of the image have been selected for authentication (selection step 72 from FIG. 6), the selected image regions are first compressed prior to hashing by the compression module inside the camera (compression step 92). If the compression module works with blocks of the image as is customary in the JPEG compression standard, the geometry of the templates need to be constructed in such a way as to contain whole blocks of the data to be compressed and no partial blocks. The digital data representing the compressed data is then hashed as described before (step 74, except the hash image is now a compressed image). Similar to the procedure described in FIG. 6, the "photographer's information" is appended to the hashed file and then encrypted to create the digital signature. Finally, the authentication process is applied to the compressed data file instead of the uncompressed file.

Figure 8:
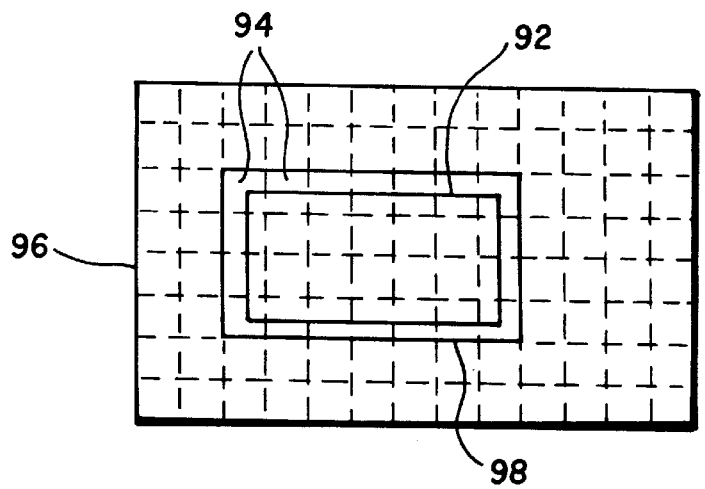
FIG. 8 is a diagram showing an expanded grid area useful in connection with the FlashPix™ format.

The authentication process can also be employed in a digital device using the FlashPix™ architecture and image file format (see FlashPix Format Specification, Version 1.0 (1996), available at the Eastman Kodak Co. Web site at www.kodak.com/go/flashpix). A FlashPix™ file contains the complete image plus a hierarchy of several lower-resolution copies within the same file. Images at each resolution also are divided into rectangular tiles (e.g., squares), which enable the application to minimize the amount of image data processed to access, display or print a portion of the scene content. One advantage of the FlashPix™ format is that each tile has its own autonomy, and can be singled out for processing separate from the other tiles. In order to implement selected area image authentication on a FlashPix™ file, the tile pattern 12 as shown in FIG. 1B may be established such that its grid pattern corresponds to the FlashPix™ tile pattern and the corresponding FlashPix™ tiles are activated during the authentication process. If custom tile patterns or preset templates are chosen as shown in FIG. 3, the custom pattern is expanded as necessary by the logic control unit 34 to include an integral number of FlashPix™ tiles. For example, as shown in FIG. 8, if a preset template 92 covers a partial area of some tiles 94 within a FlashPix™ grid pattern 96, the actual pattern processed by the signal processing section 26 will be expanded by the logic control unit 34 to cover a plurality of whole tiles as shown by the expanded template 98. While the FlashPix™ format contains a hierarchy of lower-resolution copies of the image, and authentication could be performed on any or all of the copies, the authentication process would typically be performed on a selected area of the complete image.

Figure 9:
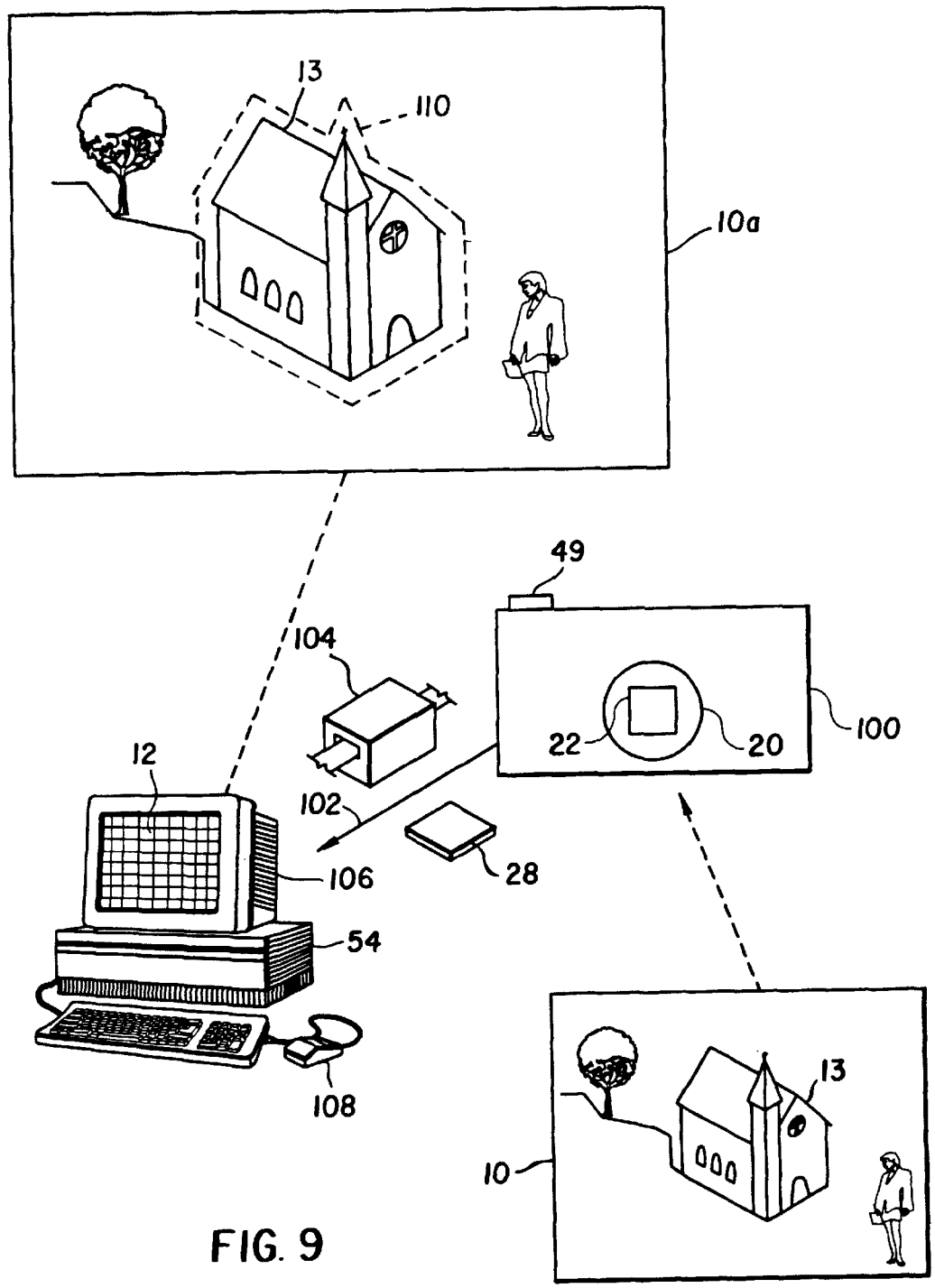
FIG. 9 is a diagram of a further embodiment showing a host computer capable of digital authentication of a selected area of an image according to the invention.

While the selected area image authentication process has been described for use in a digital camera, it can also be used in a scanner, scanning service, on-line service or a database. In general it can be used on any application running on a host computer based on images input from a camera, scanner, on-line service, database or the like. Indeed, it can be used on graphical images created by the host computer. In relation to the host computer 54, as shown in FIG. 9, the images can be input from a digital camera 100 either directly by a cable connection 102 or by the removable memory 28. Alternatively, the images can be scanned by a scanner 104. In this example, the scene image 10 includes the region of interest 13, a church, which is to be authenticated. In order to perform authentication in the host computer 54, the authentication processing is contained in a software application running on the host computer 54. For instance, the tile pattern memory 36 shown in FIG. 2 as well as the functions of tile pattern selection and designation, and the encryption of image hash with the private key 26a will be done in software in the host computer 54. A monitor 106 will display a tile pattern 12 overlaying the monitor scene image 10a and the tiles will be selected as described in connection with the digital camera embodiment. Given the increased computing power of the host computer 54, a mouse 108 can be used to trace an outline 110 around the object of interest 13. In this example, particularly in the case of a FlashPix™ file format, the traced outline 110 will be expanded by the host processor 54 to correspond to an integral number of FlashPix™ tiles.

The invention has been described with reference to a preferred embodiment. However, it will be appreciated that variations and modifications can be effected by a person of ordinary skill in the art without departing from the scope of the invention.

PARTS LIST 10 scene image
10a monitor scene image
12 tile pattern
13 region of interest
14 individual tile area
15 highlighted tile
16 preformed area
17 highlighted area
20 lens
22 CCD sensor
24 A/D converter
26 signal processing section
26a private key
28 removable output memory
30 electronic display
32 algorithm memory
34 logic control unit
36 tile pattern memory
38 tile signal generator
40 signal mixing section
42 multifunctional mode selector switch
44 tile pattern selection switch
46 tile area designation switch
48 security service switch
49 shutter release
50 image memory
52 interface
54 host computer
56 field
58 file header
60 image format
61 signature field
62 data field
64 buffer
70 capture step
72 area selection step
74 hash step
76 photographer's information step
78 encryption step
80 file generation step
82 separation step
84 identification step
86 new hash step
88 decryption step
90 compare step
92 preset template
94 partial area tiles
96 grid pattern
98 expanded template
100 digital camera
102 cable connection
104 scanner
106 monitor
108 mouse

What is claimed is:

1. A public key encryption system for authenticating image data of an image processed by a digital device, said digital device having embedded therein a private key unique to said digital device and a known public key so uniquely based upon said private key that digital data encrypted with said private key may be decrypted using said public key, said encryption system comprising:

means for designating at least one partial area of the image as an active area of the image suitable for authentication and for generating location data identifying the active area;

means for calculating image hash from image data of said active area of the image using a predetermined hash algorithm;

means for encrypting said image hash with said embedded private key, thereby producing a digital signature uniquely associated with said active area of the image; and means for storing said image data, said digital signature, and the location data of said active area in a digital record.

2. An encryption system as claimed in claim 1 wherein the digital device is a digital camera that captures an image of a scene.

3. An encryption system as claimed in claim 1 wherein the digital device is a digital scanner that scans an image of a scene.

4. An encryption system as claimed in claim 1 wherein the digital device is a digital computer that processes an image captured by another device.

5. An encryption system as claimed in claim 1 wherein the digital device is a digital computer that processes an image generated by the computer.

6. An encryption system as claimed in claim 1 wherein the image data is contained in an image file that is itself composed of a grid pattern of image file tiles.

7. An encryption system as claimed in claim 6 wherein said active area suitable for authentication is expanded as needed so as to be composed of an integral number of image file tiles.

8. An encryption system as claimed in claim 6 wherein the image file is a FlashPix™ file format.

9. An encryption system as claimed in claim 1 further comprising means for generating one or more patterns each composed of at least one partial area that is visible together with an image of an object.

10. An encryption system as claimed in claim 9 wherein said means for generating one or more patterns comprises means for storing a plurality of patterns and means for selecting one of the patterns.

11. An encryption system as claimed in claim 1 wherein the image data is compressed image data.

12. An encryption system as claimed in claim 1 wherein the location data of said active area is encrypted and stored together with the digital signature.

13. A public key encryption system for authenticating image data from an image of a scene captured by a digital camera, said digital camera having embedded therein a private key unique to said digital camera and a known public key so uniquely based upon said private key that digital data encrypted with said private key may be decrypted using said public key, said encryption system comprising:
    means for generating one or more patterns each composed of at least one individual area that is visible together with the image of the object;
    means for designating said at least one individual area as an active area of the image suitable for authentication and for generating location data identifying the active area;
    means for calculating image hash from image data of said active area of the image using a predetermined hash algorithm;
    means for encrypting said image hash with said embedded private key, thereby producing a digital signature uniquely associated with said active area of the image; and
    means for storing said image data, said digital signature, and the location data of said active area in a digital record.

14. An encryption system as claimed in claim 13 wherein the location data of said active area is encrypted and stored together with the digital signature.

15. An encryption system as claimed in claim 13 wherein the system further includes means for generating photographer's information including at least one of the time of the day, one or more exposure settings, the name of the photographer, information about the scene and its content, and other information required by the application.

16. An encryption system as claimed in claim 15 wherein the photographer's information is encrypted with the image hash.

17. An encryption system as claimed in claim 13 wherein said means for generating one or more patterns comprises means for storing a plurality of patterns and means for selecting one of the patterns.

18. An encryption system as claimed in claim 13 wherein the image data is compressed image data.

19. An encryption system as claimed in claim 13 wherein the image data is contained in an image file that is itself composed of a grid pattern of image file tiles.

20. An encryption system as claimed in claim 19 wherein said active area suitable for authentication is expanded as needed so as to be composed of an integral number of image file tiles.

21. An encryption system as claimed in claim 19 wherein the image file is a FlashPix™ file format.

22. A digital camera capable of authenticating images of a scene captured by said camera, said digital camera having embedded therein a private key unique to said digital camera and a known public key so uniquely based upon said private key that digital data encrypted with said private key may be decrypted using said public key, said digital camera comprising:
    an image sensor for capturing image data representative of the scene;
    an electronic display for displaying an image from the image data;
    means for generating one or more patterns composed of a plurality of individual area that are visible through the electronic display together with the image of the object;
    means for designating one or more individual areas as an active area of the image suitable for authentication and for generating location data identifying the active area;
    means for calculating image hash from image data of said active area of the image using a predetermined algorithm;
    means for encrypting said image hash with said embedded private key, thereby producing a digital signature uniquely associated with said active area of the image; and
    means for storing said image data, said digital signature, and the location data of said active area in a digital record.

23. A digital camera as claimed in claim 22 wherein the image data is contained in an image file that is itself composed of a grid pattern of image file tiles.

24. An encryption system as claimed in claim 23 wherein said active area suitable for authentication is expanded as needed so as to be composed of an integral number of image file tiles.

25. An encryption system as claimed in claim 23 wherein the image file is a FlashPix™ file format.

26. A camera as claimed in claim 22 wherein the camera further includes means for generating photographer's information including at least one of the time of the day, one or more exposure settings, the name of the photographer, information about the scene and its content, and other information required by the application.

27. A camera as claimed in claim 26 wherein the photographer's information is encrypted with the image hash.

28. A digital camera capable of authenticating images of a scene captured by said camera, said digital camera having embedded therein a private key unique to said digital camera and a known public key so uniquely based upon said private key that digital data encrypted with said private key may be decrypted using said public key, said digital camera comprising:
    an image sensor for capturing image data representative of the scene;
    an electronic display for displaying an image from the image data;
    means for generating one or more patterns composed of a plurality of individual area that are visible through the electronic display together with the image of the object;

means for designating one or more individual areas as an active area of the image suitable for authentication and for generating location data identifying the active area;

means for compressing the image data;

means for calculating image hash from the compressed image data of said active area of the image using a predetermined algorithm;

means for encrypting said image hash with said embedded private key, thereby producing a digital signature uniquely associated with said active area of the image; and means for storing said compressed image data, said digital signature, and the location data of said active area in a digital record.

29. A digital camera as claimed in claim 28 wherein said compressing means uses a lossy compression algorithm.

30. A system for reproducing authenticated images captured by a digital camera, said digital camera having embedded therein a private key unique to said digital camera and a known public key so uniquely based upon said private key that digital data encrypted with said private key may be decrypted using said public key, said camera hashing image data from a selected area of the image using a predetermined hash algorithm, producing encrypted image hash using the private key and generating an image file including image data, a digital signature comprising the encrypted hash, and location data identifying the selected area of the image used for the digital signature, said system comprising:

means for identifying the selected area used for the digital signature from the image file;

means for selecting image data corresponding to the selected area from the image file;

means for calculating image hash of said selected image data from the selected area of the image file using the predetermined hash algorithm;

means for decrypting said encrypted image hash with said public key, thereby producing a decrypted digital signature uniquely associated with the selected area of the image; and means for comparing the decrypted image hash with the calculated image hash to determine the authenticity of at least the selected area of the image contained in the image data.

31. A method for authenticating an image of a scene captured by a digital camera, said digital camera having embedded therein a private key unique to said digital camera and a known public key so uniquely based upon said private key that digital data encrypted with said private key may be decrypted using said public key, said method comprising the steps of:

generating one or more patterns each composed of at least one individual area that is visible together with the image of the object;

designating said at least one individual area as an active area of the image suitable for authentication and for generating location data identifying the active area;

calculating image hash from image data of said active area of the image using a predetermined hash algorithm;

encrypting said image hash with said embedded private key, thereby producing a digital signature uniquely associated with said active area of the image; and storing said image data, said digital signature, and the location data of said active area in a digital record.

32. A method as claimed in claim 31 wherein further including the step of generating photographer's information including at least one of the time of the day, one or more exposure settings, the name of the photographer, information about the scene and its content, and other information required by the application.

33. A method as claimed in claim 32 wherein the photographer's information is encrypted with the image hash.

34. A method as claimed in claim 31 further including the steps of:

identifying the active area used for the digital signature from the image file;

selecting image data corresponding to the active area from the image file;

calculating image hash of said selected image data from the active area of the image file using the predetermined hash algorithm;

decrypting said encrypted image hash with said public key, thereby producing a decrypted digital signature uniquely associated with the active area of the image; and comparing the decrypted image hash with the calculated image hash to determine the authenticity of at least the active area of the image contained in the image data.

35. A method for authenticating an image of a scene captured by a digital camera, said digital camera compressing image data representative of the scene, said digital camera having embedded therein a private key unique to said digital camera and a known public key so uniquely based upon said private key that digital data encrypted with said private key may be decrypted using said public key, said method comprising the steps of:

generating one or more patterns each composed of at least one individual area that is visible together with the image of the object;

designating said at least one individual area as an active area of the image suitable for authentication and for generating location data identifying the active area;

calculating image hash from compressed image data of said active area of the image using a predetermined hash algorithm;

encrypting said image hash with said embedded private key, thereby producing a digital signature uniquely associated with said active area of the image; and storing said compressed image data, said digital signature, and the location data of said active area in a digital record.

36. A method as claimed in claim 35 further including the steps of:

identifying the active area used for the digital signature from the image file;

selecting compressed image data corresponding to the active area from the image file;

calculating image hash of said selected compressed image data from the active area of the image file using the predetermined hash algorithm;

decrypting said encrypted image hash with said public key, thereby producing a decrypted digital signature uniquely associated with the active area of the image; and comparing the decrypted image hash with the calculated image hash to determine the authenticity of at least the active area of the image contained in the image data.

* * * * *